(12) United States Patent
Kim et al.

(10) Patent No.: US 10,661,791 B2
(45) Date of Patent: May 26, 2020

(54) INTEGRATED CONTROL SYSTEM FOR VEHICLE AND CONTROLLING METHOD THEREOF

(71) Applicants: HYUNDAI MOTOR COMPANY, Seoul (KR); KIA MOTORS CORPORATION, Seoul (KR)

(72) Inventors: DaeHwan Kim, Suwon-si (KR); Sukki Min, Suwon-si (KR); Jongmo Kim, Goyang-si (KR); Bongchul Ko, Hwaseong-si (KR); SungYun Kim, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 31 days.

(21) Appl. No.: 16/012,825

(22) Filed: Jun. 20, 2018

(65) Prior Publication Data
US 2019/0248365 A1    Aug. 15, 2019

(30) Foreign Application Priority Data
Feb. 14, 2018   (KR) .......................... 10-2018-0018333

(51) Int. Cl.
| | |
|---|---|
| *B60W 10/18* | (2012.01) |
| *B60W 30/09* | (2012.01) |
| *B60W 10/20* | (2006.01) |
| *B60W 30/18* | (2012.01) |

(52) U.S. Cl.
CPC ............ *B60W 30/09* (2013.01); *B60W 10/18* (2013.01); *B60W 10/20* (2013.01); *B60W 30/18109* (2013.01); *B60W 2420/42* (2013.01); *B60W 2510/202* (2013.01); *B60W 2554/00* (2020.02); *B60W 2710/18* (2013.01); *B60W 2710/202* (2013.01)

(58) Field of Classification Search
None
See application file for complete search history.

(56) References Cited

U.S. PATENT DOCUMENTS

| | | | | |
|---|---|---|---|---|
| 7,165,644 | B2 * | 1/2007 | Offerle | B60T 8/1755 |
| | | | | 180/244 |
| 2017/0029026 | A1 * | 2/2017 | Okuda | B62D 15/0265 |
| 2018/0284799 | A1 * | 10/2018 | Tokunaga | G05D 1/0234 |
| 2018/0345978 | A1 * | 12/2018 | Fujii | B60W 30/18163 |

FOREIGN PATENT DOCUMENTS

JP        2008149860 A  *  7/2008

* cited by examiner

*Primary Examiner* — Genna M Mott
*Assistant Examiner* — Melanie J Patrick
(74) *Attorney, Agent, or Firm* — Morgan, Lewis & Bockius LLP

(57) ABSTRACT

In accordance with one aspect of the present disclosure, a vehicle may include a plurality of sensors configured to detect an object and to output a plurality of detection signals having a steering torque related to a result of detection; a braking device driver configured to drive a driving device of the vehicle; and a controller configured to select a single detection signal among the plurality of detection signals based on a predetermined priority, and configured to output an integrated control signal controlling the braking device driver based on the determined steering torque of the detection signal.

8 Claims, 21 Drawing Sheets

INTEGRATED CONTROL SYSTEM FOR VEHICLE AND CONTROLLING METHOD THEREOF

CROSS-REFERENCE TO RELATED APPLICATION(S)

This application is based on and claims priority under 35 U.S.C. § 119 to Korean Patent Application No. 10-2018-0018333, filed on Feb. 14, 2018, in the Korean Intellectual Property Office, the disclosure of which is incorporated by reference herein in its entirety.

TECHNICAL FIELD

The present disclosure relates to a vehicle capable of providing mediated and integrated control for a plurality of systems outputting control signals, and a controlling method thereof, more particularly, to a vehicle capable of mediating and integrating a plurality of braking signals output by a plurality of braking systems, and outputting a mediated and integrated signal, and a controlling method thereof.

BACKGROUND

Conventional Art installs, a plurality of sensors provided in a vehicle perform a single function. However, due to the development of technology, such as an advanced driver assistance system (ADAS) including a safety system and a convenience system a single sensor may perform a plurality of functions.

However, since the single sensor performs a number of functions and the number of systems applied to the vehicle increases, specifications management and quality control become difficult, and thus, there is a problem that control of functions by a plurality of systems becomes difficult.

In addition, since a sensor applied to each system outputs a control signal according to the conventional manner, there is a problem that collision occurs between systems when control signals of the same kind are overlapped.

For example, when different braking signals are simultaneously output from a system related to braking in the safety system, there may be a problem that the braking signals collide with each other. Therefore, a technique for mediating or integrating a plurality of braking signals is needed.

SUMMARY

An aspect of the present disclosure provides a vehicle capable of integrating a plurality of signals output from a plurality of systems related to braking, and a controlling method thereof.

It is another aspect of the present disclosure to provide a vehicle capable of reducing an overlapped control signal and effectively performing advance driver assistance systems (ADAS), by performing series of braking and steering according to the priority in an area, in which a plurality of control signals, output from a plurality of systems related to the braking is overlapped, and a controlling method thereof.

Additional aspects of the present disclosure will be set forth in part in the description which follows and, in part, will be obvious from the description, or may be learned by practice of the present disclosure.

In accordance with one aspect of the present disclosure, a vehicle may include: a plurality of sensors configured to detect an object and to output a plurality of detection signals having a steering torque related to a result of detection; a braking device driver configured to drive a driving device of the vehicle; and a controller configured to select a single detection signal among the plurality of detection signals based on a predetermined priority, and configured to output an integrated control signal controlling the braking device driver based on the determined steering torque of the detection signal.

While outputting the integrated control signal related to a first detection signal among the plurality of detection signals, the controller may select the detection signal by identifying whether a second detection signal having a high priority is turned on.

The controller may output the integrated control signal by comparing a sign of a first steering torque of the first detection signal with a sign of a second steering torque of the second detection signal.

When the sign of the first steering torque is identical to the sign of the second steering torque, the controller may select the detection signal based on the priority.

When the sign of the first steering torque is not identical to the sign of the second steering torque, the controller may select the detection signal based on a magnitude of the steering torque.

When the magnitude of the first steering torque is greater than the magnitude of the second steering torque, the controller may select the detection signal including the second steering torque.

When the magnitude of the second steering torque is greater than the magnitude of the first steering torque, the controller may select the detection signal.

In accordance with another aspect of the present disclosure, a control method of vehicle may include: receiving, by a controller, a plurality of detection signals having a steering torque related to a detection result of a plurality of sensors detecting an object; selecting, by the controller, a single detection signal among the plurality of detection signals, based on a predetermined priority; outputting, by the controller, an integrated control signal controlling a braking device driver, based on the selected steering torque of detection signal; and driving, by the controller, the braking device driver of the vehicle based on the integrated control signal.

The selection of the detection signal may include selecting the detection signal by identifying whether a second detection signal having a high priority is turned on, while outputting the integrated control signal related to a first detection signal among the plurality of detection signals.

The output of the integrated control signal may include outputting the integrated control signal by comparing a sign of a first steering torque of the first detection signal with a sign of a second steering torque of the second detection signal.

The selection of the detection signal may include selecting the detection signal based on the priority when the sign of the first steering torque is identical to the sign of the second steering torque.

The selection of the detection signal may include selecting the detection signal based on a magnitude of the steering torque when the sign of the first steering torque is not identical to the sign of the second steering torque.

The selection of the detection signal may include selecting the detection signal when the magnitude of the first steering torque is greater than the magnitude of the second steering torque.

The output of the integrated control signal may include storing a point of time of outputting the integrated control signal, and when it is identified that the second detection signal is turned on, outputting the integrated control signal by converting the point of time.

BRIEF DESCRIPTION OF THE DRAWINGS

These and/or other aspects of the disclosure will become apparent and more readily appreciated from the following description of embodiments, taken in conjunction with the accompanying drawings.

DETAILED DESCRIPTION

Figure 1:
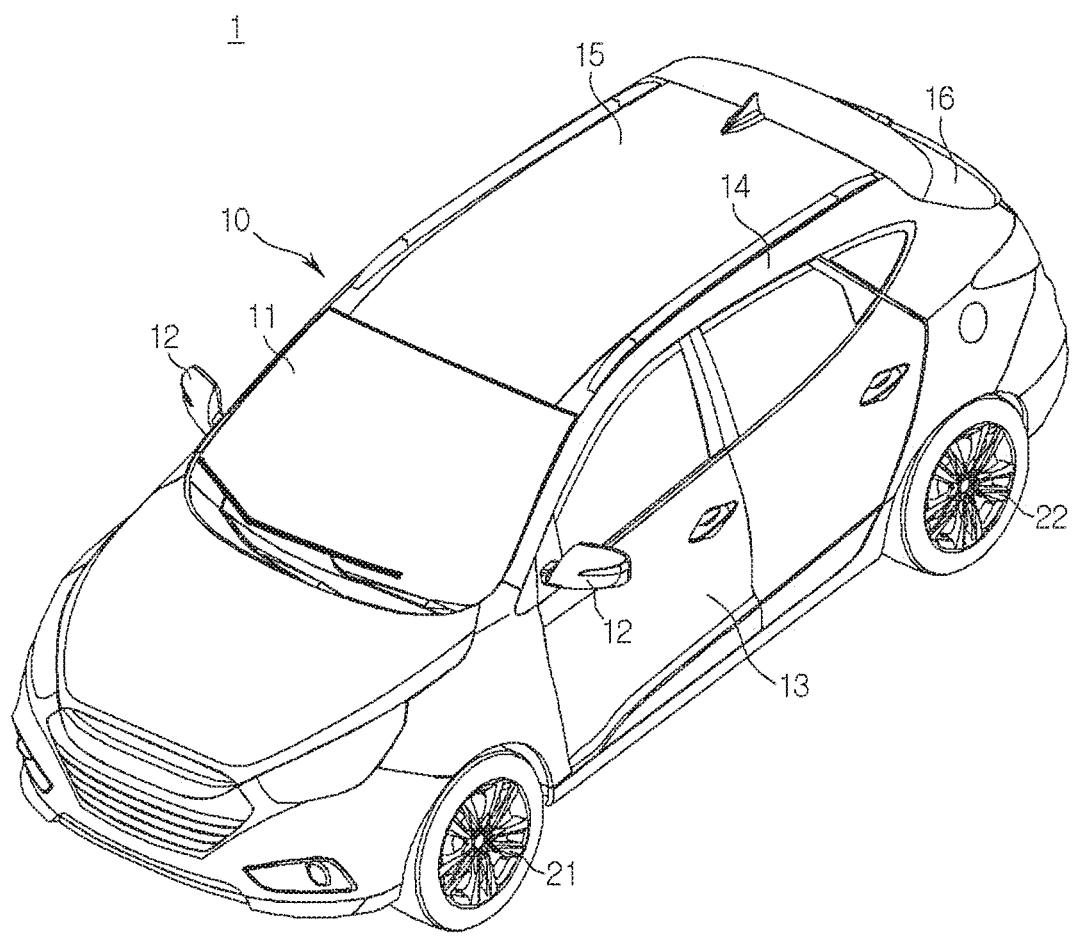
FIG. 1 is a view illustrating an external appearance of a vehicle according to an embodiment.

Embodiments described in the present disclosure and configurations shown in the drawings are merely examples of the embodiments of the present disclosure, and may be modified in various different ways at the time of filing of the present application to replace the embodiments and drawings of the present disclosure.

The terms used herein are used to describe the embodiments and are not intended to limit and/or restrict the present disclosure. The singular forms "a," "an" and "the" are intended to include the plural forms as well, unless the context clearly indicates otherwise.

In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof. It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element.

It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

Hereinafter, an embodiment of a vehicle amplifier and a vehicle including the same will be described in detail with reference to the accompanying drawings.

Figure 2:
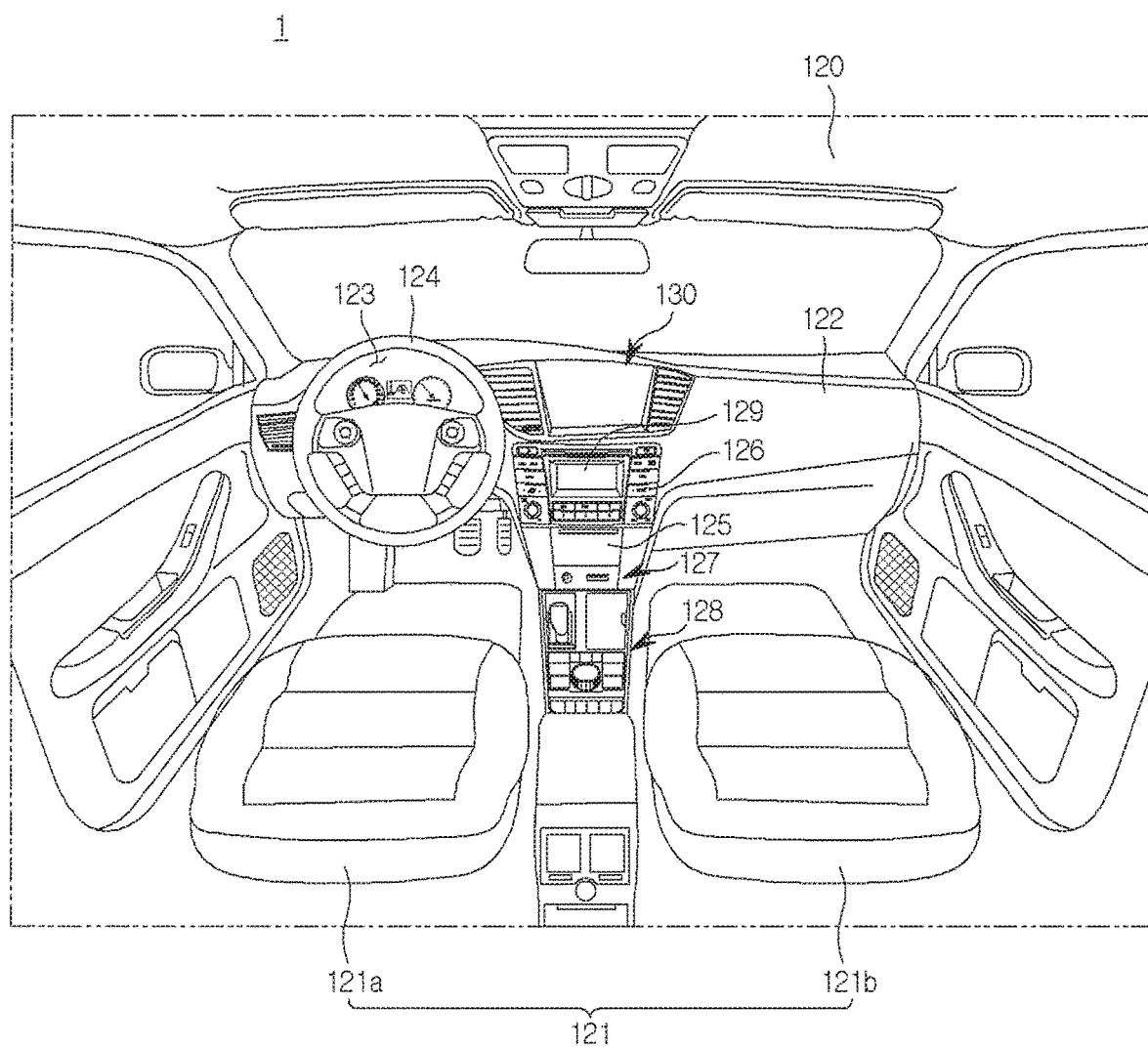
FIG. 2 is a view illustrating an internal appearance of the vehicle according to an embodiment.

FIG. 1 is a view illustrating an external appearance of a vehicle according to an embodiment, and FIG. 2 is a view illustrating an internal appearance of the vehicle according to an embodiment.

Referring to FIG. 1, a vehicle 1 includes a body 10 forming an exterior of the vehicle 1, a windscreen 11 providing a front view of the vehicle 1 to a driver, a side mirror 12 providing a view of a rear side of the vehicle 1 to the driver, a door 13 closing the inside of the vehicle 1 from the outside, a front wheel 21 disposed on a front side of the vehicle and a rear wheel 22 disposed on a rear side of the vehicle, wherein the front wheel 21 and the rear wheel 22 may be referred to as vehicle wheels.

The windscreen 11 may be provided on an upper portion of the front of the body 10 to allow the driver inside the vehicle 1 to acquire visual information about the front of the vehicle 1. The side mirror 12 may include a left side mirror provided on the left side of the body 10 and a right side mirror provided on the right side of the body 10, and may allow the driver inside the vehicle 1 to acquire visual information of the lateral side and the rear side of the vehicle 1.

The door 13 may be pivotally installed on a right side and a left side of the body 10. When the door 13 is opened, a driver may be allowed to be seated in the vehicle 1, and when the door 13 is closed, the inside of the vehicle 1 may be closed from the outside.

Further, the vehicle 1 may include a sensor 200 (see FIG. 3) configured to detect an object located in front of or behind the vehicle. The sensor 200 may be mounted in a front radiator grille of the vehicle 1 or in a front headlamp. Alternatively, the sensor 200 may be integrated into a hot wire in an upper side of a rear window glass 16 corresponding to the rear side of the roof panel 15, but a position of the sensor 200 is not limited thereto.

A detailed description of the plurality of sensors 200 provided in the vehicle 1 will be described later with reference to other drawings.

Referring to FIG. 2, an interior 120 of the body may include a seat 121; 121a and 121b on which a passenger is seated, a dashboard 122, an instrument panel 123, i.e. a cluster, a steering wheel 124 to change the direction of the vehicle, and a center fascia 125 in which an operation panel of an audio device and an air conditioning device is installed, wherein the instrument panel 123 may be disposed on the dashboard 122 and may include a tachometer, a speedometer, a coolant temperature indicator, a fuel indicator, a turn signal indicator, a high beam indicator light, a warning light, a seat belt warning light, a trip odometer, an odometer, an automatic transmission selector lever indicator, a door open warning light, an oil warning light, and a low fuel warning light.

The seat 121 may include a driver seat 121a on which a driver is seated, a passenger seat 121b on which a passenger is seated, and a rear seat provided in the rear side of the inside of the vehicle.

The cluster 123 may be implemented in a digital manner. The cluster 123 in the digital manner may display vehicle information and driving information as an image.

Among the dashboard 122, the center fascia 125 may be disposed between the driver seat 121a and the passenger seat 121b, and may include a head unit 126 configured to control the audio device, the air conditioning device and a hot-wire in the seat.

The head unit 126 may include a plurality of buttons to receive an input of an operation command for the audio device, the air conditioning device, and the hot-wire in the seat.

In the center fascia 125, an air outlet, a cigar jack, and a multi-terminal 127 may be installed.

The multi-terminal 127 may be disposed adjacent to the head unit 126, and may include a USB port, an AUX terminal, and further include a SD slot.

The vehicle 1 may further include an input 128 configured to receive an operation command of a variety of functions, and a display 129 configured to display information related to a function currently performed, and information input by a user.

A display panel of the display 129 may employ Light Emitting Diode (LED) panel, Organic Light Emitting Diode (OLED) panel or Liquid Crystal Display (LCD) panel.

The input 128 may be disposed on the head unit 126 and the center fascia 125, and may include at least one physical button such as On/Off button for operation of the variety of functions, and a button to change a set value of the variety of functions.

The input 128 may transmit an operation signal of the button to an Electronic Controller (ECU) and a controller 300 (see FIG. 3) in the head unit 126 or the AVN device 130.

The input 128 may include a touch panel integrally formed with the display of the AVN device 130. The input 128 may be activated and displayed in the shape of the button, on the display of the AVN device 130, and may receive an input of the location information of the button displayed.

The input 128 may further include a jog dial (not shown) or a touch pad to input a command for moving cursor and selecting cursor, wherein the cursor is displayed on the display of the AVN device 130. The jog dial or touch pad may be provided in the center fascia.

Particularly, the input 128 may be capable of receiving any one of input of a manual driving mode, in which a driver directly drives a vehicle, and an autonomous driving mode, and may transmit an input signal of the autonomous driving mode to the controller 300 when the autonomous driving mode is input.

The controller 300 may be configured to transmit a signal about a control command, to devices in the vehicle 1 as well as being configured to distribute a signal to the devices in the vehicle 1. Although it is referred to as the controller 300, this is an expression to be interpreted in a broad sense, but is not limited thereto.

When a navigation function is selected, the input 128 may receive an input of information related to the destination, transmit the input information related to the destination to the AVN device 130, and when a DMB function is selected, the input 128 may receive an input of information related to the channel and sound volume, and transmit the input information related to the channel and sound volume to the AVN device 130.

The AVN device 130 configured to receive information from a user and to output a result corresponding to the input information may be provided in the center fascia 125.

The AVN device 130 may perform at least one function of a navigation function, a DMB function, an audio function, and a video function, and may display information related to the road condition and the driving during the autonomous driving mode.

The AVN device 130 may be installed on the dash board to be vertically stood.

The chassis of the vehicle may further include a power system, a power train, a steering system, a brake system, a suspension system, a transmission device, a fuel system and front, rear, left and right vehicle wheels. The vehicle may further include a variety of safety devices for a driver and passenger safe.

The safety devices of the vehicle may include a variety of safety devices, such as an air bag control device for the safety of the driver and passenger when the collision of the vehicle, and an Electronic Stability Control (ESC) configured to maintain the stability of the vehicle when accelerating or cornering.

The vehicle 1 may further include a detection device, e.g. a proximity sensor configured to detect an obstacle or another vehicle placed in the rear side or the lateral side of the vehicle; a rain sensor configured to detect whether to rain or an amount of rain; a wheel speed sensor configured to detect the wheel of the vehicle; a lateral acceleration sensor configured to detect a lateral acceleration of the vehicle; a yaw rate senor and a gyro sensor configured to detect the variation of angular speed of the vehicle; and a steering angle sensor configured to detect a rotation of a steering wheel of the vehicle.

The vehicle 1 may include an Electronic Control Unit (ECU) configured to control an operation of the power system, the power train, a driving device such as an engine or a motor, the steering system, the brake system, the suspension system, the transmission device, the fuel system, the variety of safety devices, and the variety of sensors.

The vehicle 1 may selectively include an electronic device such as a hand-free device, a GPS, an audio device, a Bluetooth device, a rear camera, a device for charging terminal device, and a high-pass device, which are installed for the convenience of the driver.

The vehicle 1 may further include an ignition button configured to input an operation command to an ignition motor (not shown).

That is, when the ignition button is turned on, the vehicle 1 may turn on an ignition motor (not shown) and drive an engine (not shown) that is the power generation device, by the operation of the ignition motor.

The vehicle 1 may further include a battery (not shown) electrically connected to a terminal device, an audio device, an interior lamp, an ignition motor and other electronic device to supply a driving power to the terminal device, the audio device, the interior lamp, the ignition motor and other electronic device. The battery may perform a charging by using a generator itself or power from an engine, while the vehicle travels.

Figure 3:
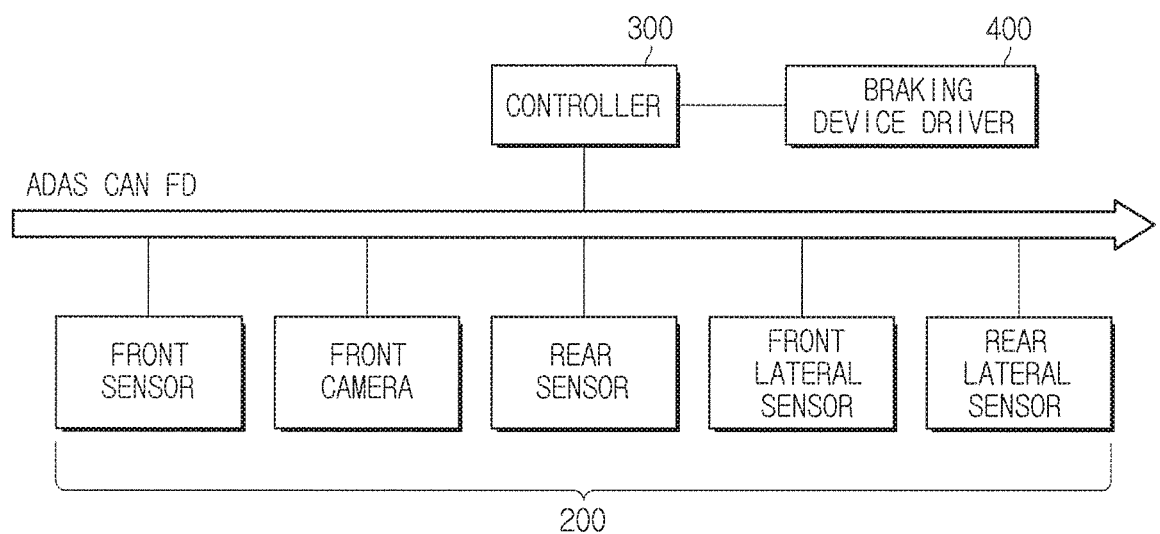
FIGS. 3 and 4 are block diagrams illustrating a structure for integrated control by receiving signals from a plurality of sensors in the vehicle according to an embodiment.
Figure 4:
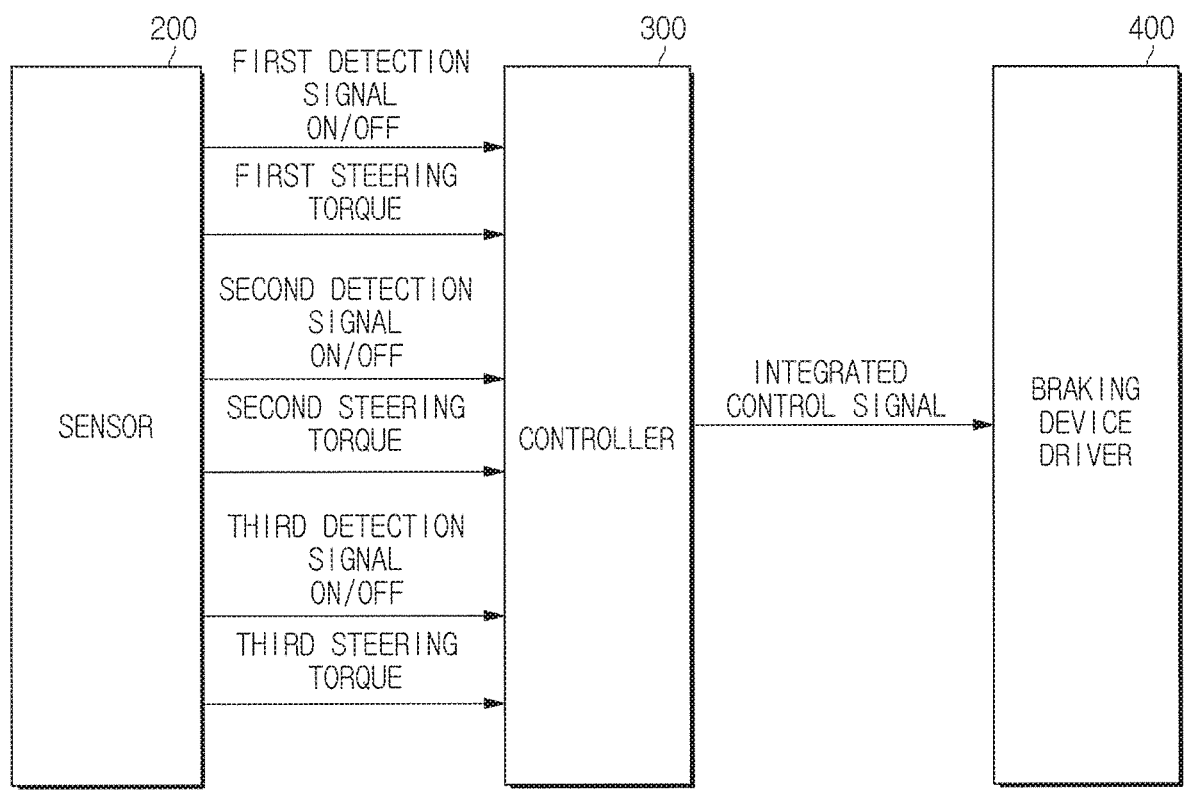

FIGS. 3 and 4 are block diagrams illustrating a structure for integrated control by receiving signals from a plurality of sensors in the vehicle according to an embodiment.

Referring to FIG. 3, the vehicle 1 includes a plurality of sensors 200, a controller 300, and a braking device driver 400.

The plurality of sensors 200 may include various devices capable of detecting or recognizing an object, wherein the various devices may include a front/rear sensor, a front/rear camera, a front lateral side sensor, and a rear lateral side sensor.

The plurality of sensors 200 generate and output different detection signals when detecting an object. In addition, detection signals output by the plurality of sensors 200 include steering torques at respective time points for braking the vehicle 1 according to a result of detecting an object.

In other words, the vehicle 1 operates an advanced driver assistance system (ADAS) based on a steering torque output from the plurality of sensors 200, wherein the ADAS may assist the driving of the vehicle 1 and may perform an auxiliary drive function configured to avoid a collision with an object approaching from the outside, by using a lane departure warning function, a blind spot detection function, and a rear detection function.

The disclosed vehicle 1 performs a single collision avoidance function by integrally combining signals output from the plurality of sensors 200 so that collision avoidance can be performed, wherein the collision is caused by the detected object.

The ADAS may include a plurality of devices that is connected via a vehicle communication network (NT). For example, the ADAS may include Forward Collision Warning System (FCW), Advanced Emergency Braking System (AEBS), Adaptive Cruise Control (ACC), Lane Departure Warning System (LDWS), Lane Keeping Assist System (LKAS), Blind Spot Detection (BSD) and Rear-end Collision Warning System (RCW).

A variety of the electric device included in the vehicle 1 may communicate with each other via the vehicle communication network (NT). The vehicle communication network (NT) may employ a communication standard, e.g. Media Oriented Systems Transport (MOST) having a maximum communication speed of 24.5 Mega-bits per second (Mbps), FlexRay having a maximum communication speed of 10 Mbps, Controller Area Network (CAN) having a communication speed of 125 kilo-bits per second (kbps) to 3.7 Mbps, and Local Interconnect Network (LIN) having a communication speed of 20 kbps. The vehicle communication network (NT) may employ a single communication standard, e.g. MOST, FlexRay, CAN, and LIN, but also may employ a plurality of communication standards.

The controller 300 may integrate a plurality of detection signals received from a plurality of sensors 200, and output an integrated control signal.

Particularly, the controller 300 may identify a result of detection corresponding to whether a detection signal is turned on or off, according to a detection signal transmitted from the plurality of sensors 200. The controller 300 may receive a second detection signal while controlling the braking device driver 400 based on a steering torque related to the first detection signal since the first detection signal is turned on.

In this case, according to a predetermined priority, the controller 300 may identify whether to perform a braking related to the first detection signal or a braking related to the second detection signal.

Based on the identification result, the controller 300 may generate and output an integrated control signal for controlling the braking device driver 400. A detailed description of a method in which the controller 300 generates the integrated control signal will be described later with reference to the other drawings.

The controller 300 may be implemented using a memory (not shown) storing an algorithm for controlling an operation of components in the vehicle 1 and data related to programs implementing the algorithm, and a processor (not shown) performing the above mentioned operation using the data stored in the memory. The memory and the processor may be implemented in separate chips, or a single chip.

The controller 300 may be provided in the vehicle 1 as a separate module for generating an integrated control signal.

The braking device driver 400 may receive an integrated control signal from the controller 300 and drive a braking device of the vehicle 1.

Referring to FIG. 4, upon the detection of a plurality of objects, the sensor 200 may generate and output a detection signal including a steering torque for braking the vehicle 1, according to a result of the detection.

The detection signal may include on/off signals for identifying the plurality of sensors 200 and information related to a steering torque generated by the sensor 200 for braking. Particularly, the on/off signals may represent an identification (ID) of the sensor 200 and the steering torque may represent a force for steering configured to steer the vehicle wheels 21 and 22 proportional to a steering force, which is applied by a driver to operate the steering wheel.

For example, when the vehicle 1 includes three different sensors 200, each sensor 200 may output a detection signal including a result of detection, and the controller 300 may generate and output an integrated control signal configured to control the braking device driver 400 based on on/off of the detection signal and steering torque contained in three detection signals.

However, the number of the plurality of sensors 200 is not limited to three.

Figure 5:
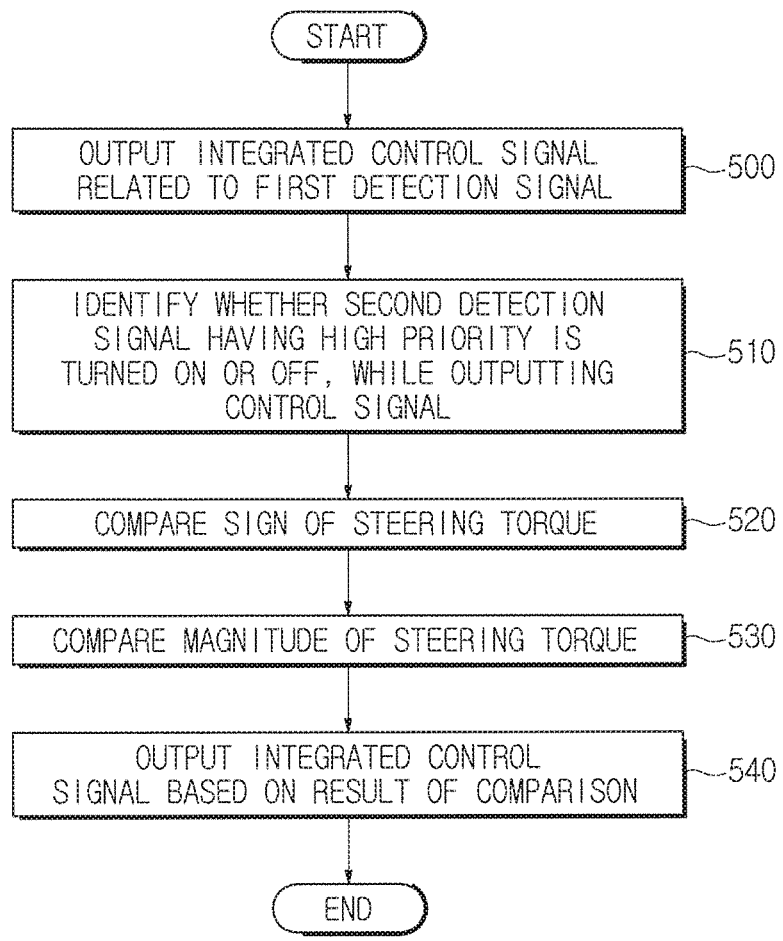
FIG. 5 is a flow chart illustrating a method for outputting an integrated control signal.

FIG. 5 is a flow chart illustrating a method for outputting an integrated control signal.

Referring to FIG. 5, the controller 300 may output an integrated control signal related to the first detection signal (500).

The first detection signal corresponds to a braking signal output from at least one of the plurality of sensors 200, and includes a steering torque required for braking.

While outputting the integrated control signal, the controller 300 may receive a second detection signal output by other sensor device (510).

That is, when the second detection signal, i.e., other sensor is turned on, the controller 300 may identify that it is needed to change a braking related to the first detection signal.

This identification process is performed according to the predetermined priority.

For example, when a priority of the first detection signal is higher than a priority of the currently detected second detection signal, the controller 300 may not change the above mentioned integrated control signal, and control the braking device driver 400 based on the previous integrated control signal.

However, when the priority of the received second detection signal is higher than the priority of the first detection signal, the controller 300 may change the integrated control signal related to the first detection signal.

As for the method of changing the integrated control signal, the controller 300 may first compare a sign of the first steering torque included in the first detection signal with a sign of the second steering torque (520).

When the sign of the first steering torque is opposite to the sign of the second steering torque, the controller 300 may immediately change the integrated control related to the first detection signal, into an integrated control signal related to the second detection signal.

However, when the sign of the first steering torque is the same as the sign of the second steering torque, the controller 300 may compare the magnitude of the steering torque (530), and the controller 300 may output the integrated control signal again based on the comparison result (540).

Figure 6:
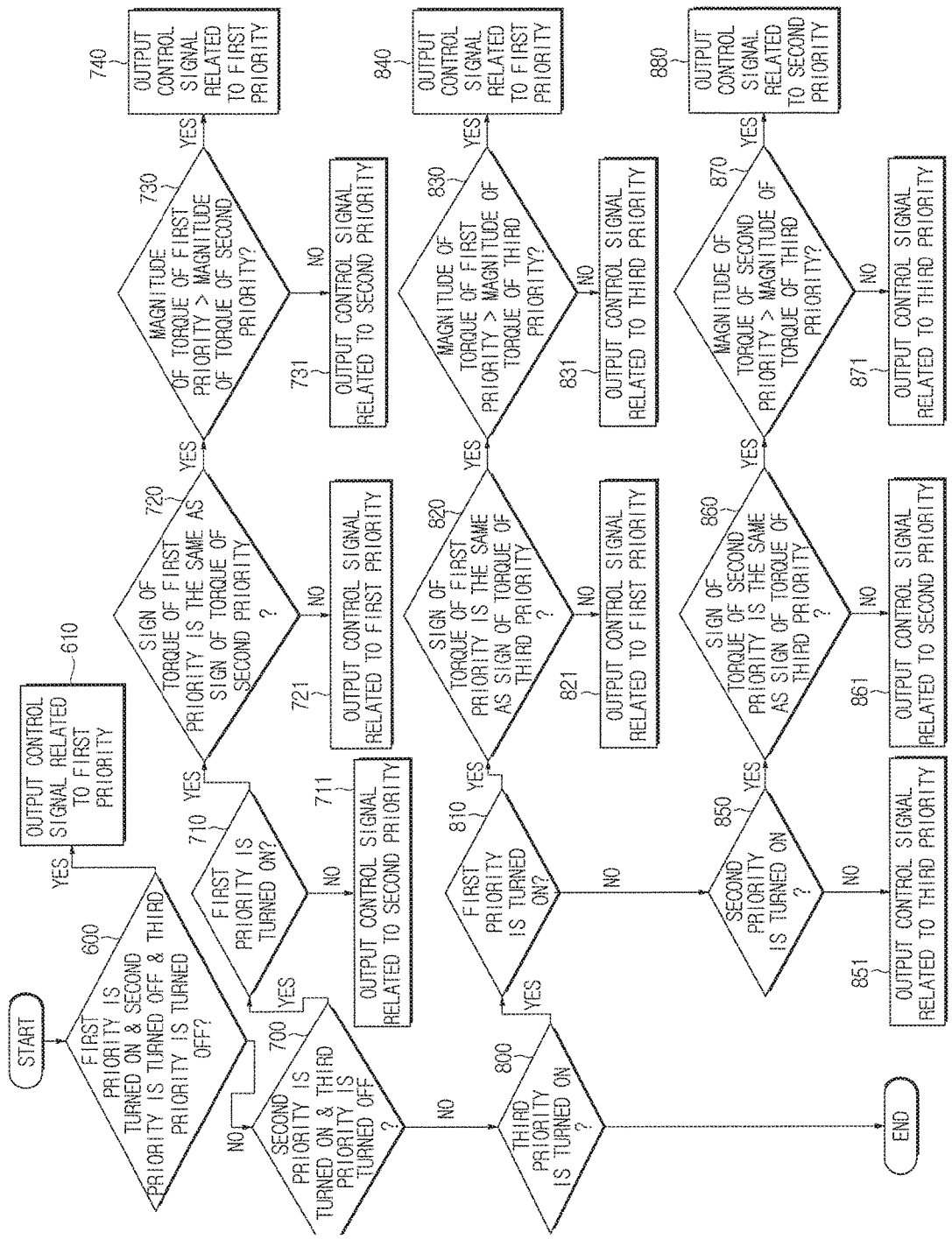
FIG. 6 is a flowchart illustrating a method of outputting an integrated control signal based on a priority according to an embodiment in detail.
Figure 7A:
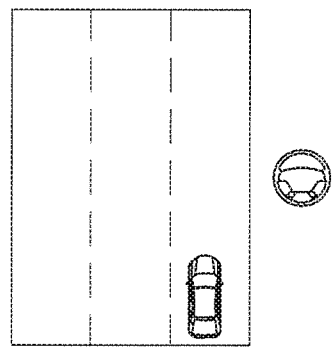
FIGS. 7A-7G are views illustrating a method of outputting an integrated control signal when signs of the steering torque are not the same.
Figure 7B:
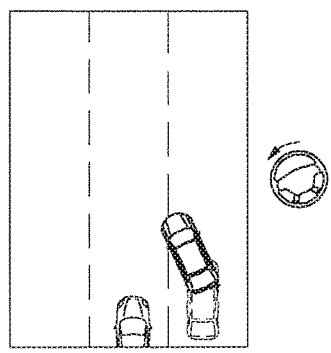
Figure 7C:
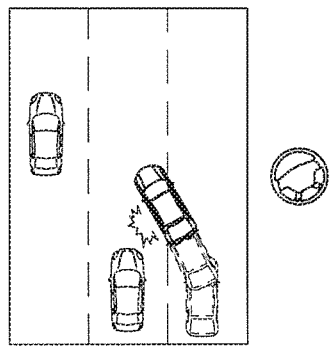
Figure 7D:
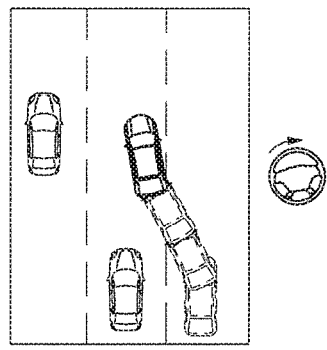
Figure 7E:
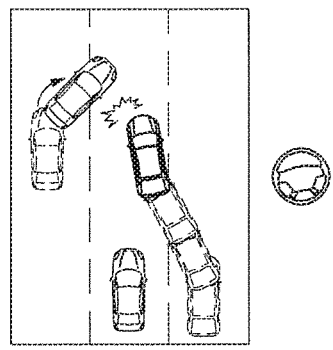
Figure 7F:
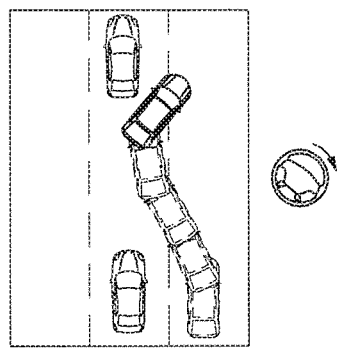
Figure 7G:
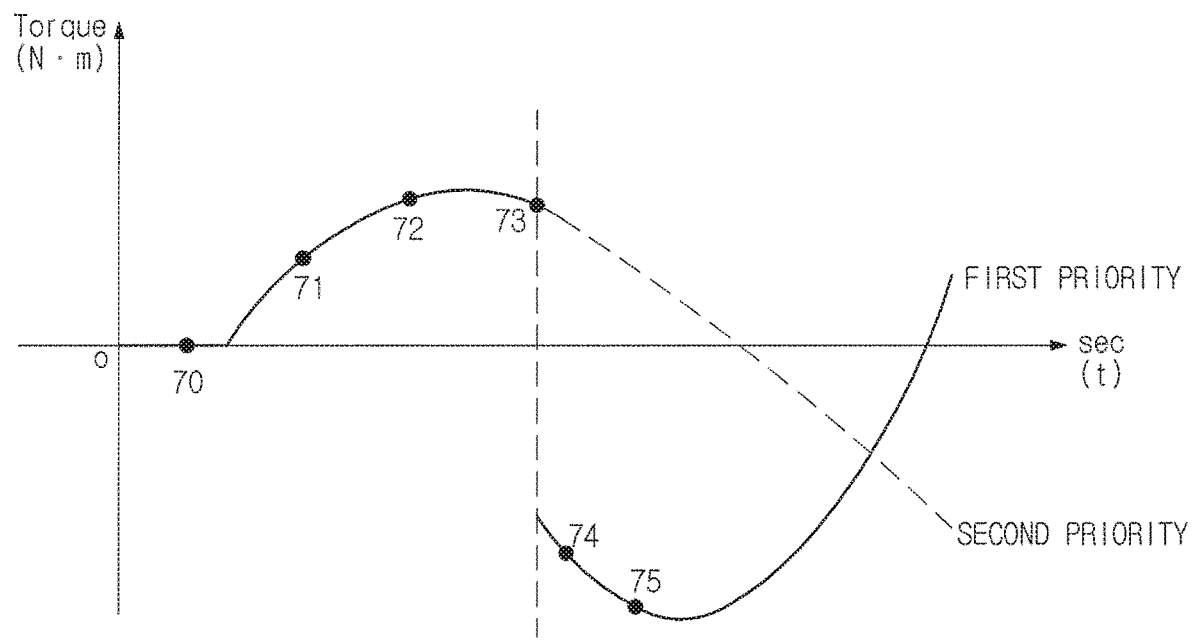
Figure 8A:
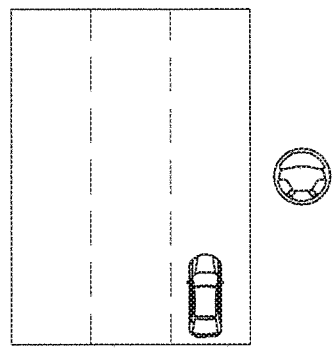
FIGS. 8A-8H are views illustrating a method of outputting an integrated control signal when the signs of the steering torque are the same.
Figure 8B:
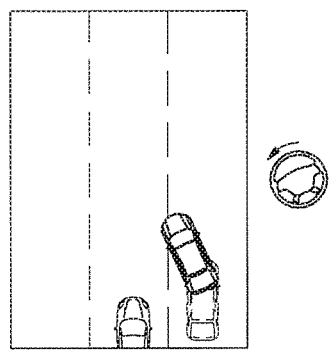
Figure 8C:
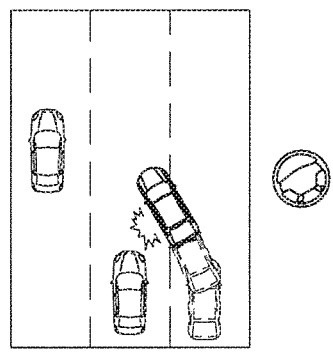
Figure 8D:
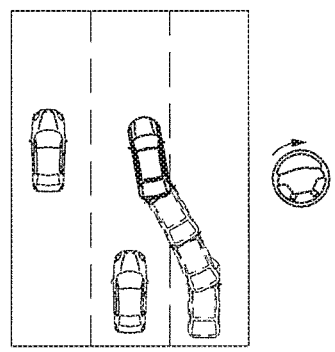
Figure 8E:
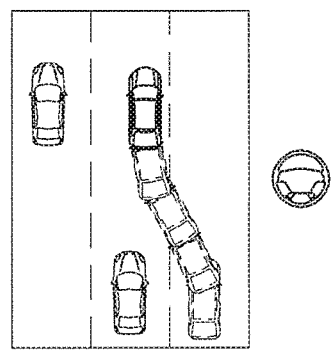
Figure 8F:
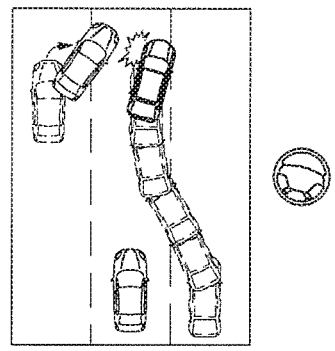
Figure 8G:
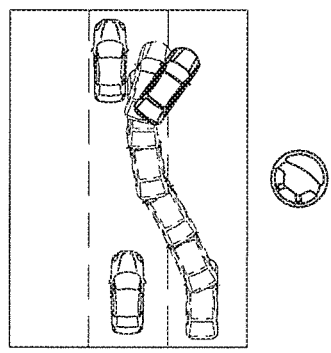
Figure 8H:
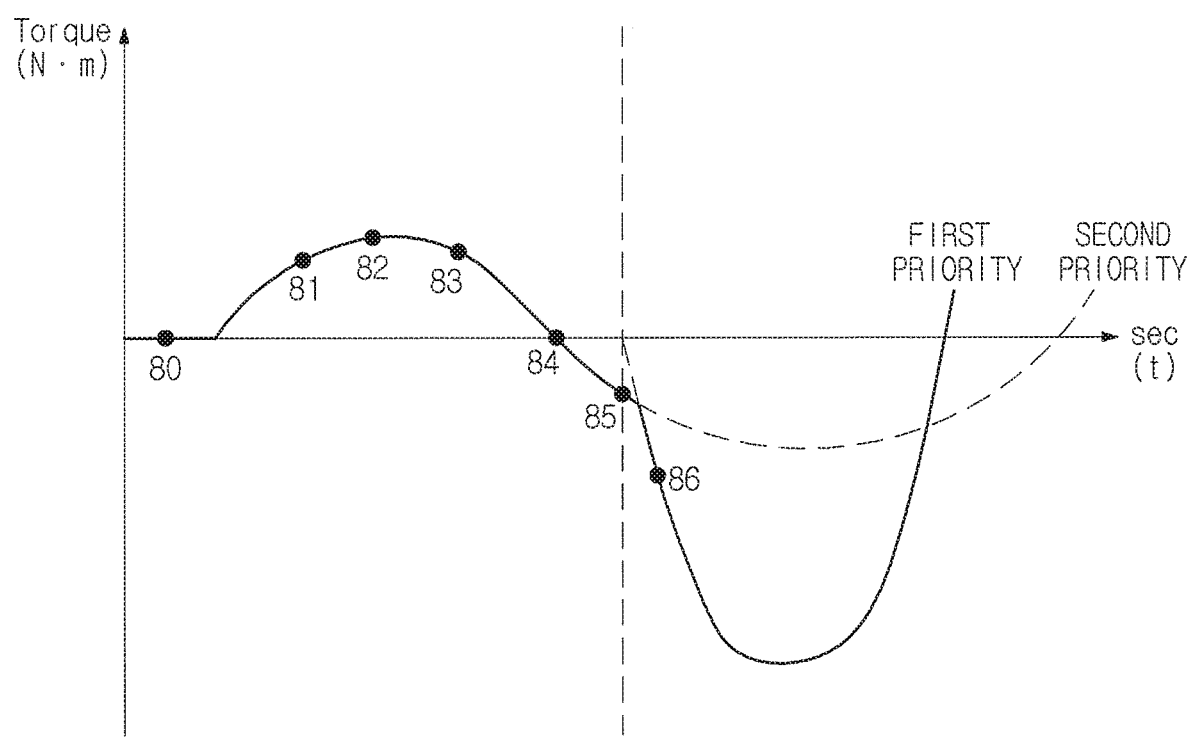

FIG. 6 is a flowchart illustrating a method of outputting an integrated control signal based on a priority according to an embodiment in detail.

Referring to FIG. 6, the controller 300 may identify whether a detection signal having a predetermined priority is turned on or off. Hereinafter, for description of convenience, a detection signal having a higher priority is referred to as a first priority, a second priority, and a third priority in order.

For example, the controller 300 may identify that a detection signal having the highest priority (hereinafter it is referred to as a first priority) is turned on, a detection signal having the next high priority (hereinafter it is referred to as a second priority) is turned off, and a detection signal having the last priority (hereinafter it is referred to as a third priority) is turned off (600).

In this case, the controller 300 may output an integrated control signal related to the steering torque contained in the detection signal having the first priority, and control the braking device driver 400 (610).

However, when the first priority is turned off, the controller 300 may identify whether the second priority is turned on and the third priority is turned off (700).

In this case, the controller 300 may output the integrated control signal related to the second priority. While controlling the braking device driver 400 based on the second priority, the controller 300 may monitor whether the first priority is turned on (710).

When the first priority is not turned on, the controller 300 may output an integrated control signal related to the second priority (711).

However, when the first priority is turned on, the controller 300 may identify whether a sign of a steering torque of the first priority is the same as a sign of a steering torque of the second priority (720).

When the sign of the steering torque of the first priority is not the same as the sign of the steering torque of the second priority, the controller 300 may output an integrated control signal related to the first priority having a higher priority (721). Otherwise, when the sign of the steering torque of the first priority is the same as the sign of the steering torque of the second priority, the controller 300 may compare a magnitude of the steering torque of the first priority with a magnitude of the steering torque of the second priority, again (730).

When the magnitude of the steering torque of the first priority is less than the magnitude of the steering torque of the second priority, the controller 300 may not change the integrated control related to the first priority, and the controller 300 may continuously control the braking device driver 400 based on the second priority until the magnitude of the steering torque is increased (731).

At any point of time when the controller 300 controls the braking device driver 400 based on the second priority, the magnitude of the steering torque contained in the first priority may be greater than the magnitude of the steering torque contained in the second priority. In this case, the controller 300 may change the control of the braking device driver 400 based on the second priority and start to control the braking device driver 400 based on the first priority (740).

On the other hand, the first priority and the second priority may be turned off, and only the third priority may be turned on (800). In this case, the controller 300 may output an integrated control signal related to the third priority.

While outputting the integrated control signal related to the third priority, the controller 300 may monitor whether the first priority and the second priority are turned on.

When the first priority is turned on (810), the controller 300 may identify whether the sign of the steering torque of the first priority is the same as the sign of a steering torque of the third priority (820). When the sign of the steering torque of the first priority is not the same as the sign of the steering torque of the third priority, the controller 300 may output an integrated control signal related to the first priority having a higher priority (821).

Otherwise, when the sign of the steering torque of the first priority is the same as the sign of the steering torque of the third priority, the controller 300 may compare the magnitude of the steering torque related to the first priority with a magnitude of a steering torque at a point of time when the integrated control related to the third priority is performed (830).

When the magnitude of the torque of the first priority is not greater than the torque of the third priority, the controller 300 may output the integrated control signal related to the third priority (831). However, the controller 300 may output the integrated control signal related to the first priority at a point of time when the magnitude of the torque of the first priority is greater than the torque of the third priority (840).

When the first priority is turned off, the controller 300 may determine that other than the first priority, whether the second priority is turned on (850).

When the second priority is turned off, the controller 300 may output a control signal related to the third priority (851).

When the second priority is turned on, the controller 300 may identify whether the sign of the torque of the second priority is the same as the sign of the torque of the third priority (860). When the sign of the torque of the second priority is not the same as the sign of the torque of the third priority, the controller 300 may output the integrated control signal related to the second priority, which is the higher priority (861).

Otherwise, when the sign of the torque of the second priority is the same as the sign of the torque of the third priority, the controller 300 may compare the magnitude of the steering torque related to the second priority with a magnitude of a steering torque at a point of time when the integrated control related to the third priority is performed (870).

When the magnitude of the torque of the second priority is not greater than the torque of the third priority, the controller 300 may output the integrated control signal related to the third priority (871). However, the controller 300 may output the integrated control signal related to the second priority at a point of time when the magnitude of the torque of the second priority is greater than the torque of the third priority (880).

FIGS. 7A-7G are views illustrating a method of outputting an integrated control signal when signs of the steering torque are not the same. FIGS. 8A-8H are views illustrating a method of outputting an integrated control signal when the signs of the steering torque are the same. The following will be described together to avoid the duplication.

Referring to FIGS. 7A-7G, the vehicle 1 drives straight on a three-lane road (70). In this case, the steering wheel 124 may be shown as a symbol located on the right side, and the straight driving may be indicated as "70" in a graph in which the time is represented by an X-axis and a steering torque is represented by a Y-axis.

For example, the driver may change the lane by operating the steering wheel 124 counterclockwise (71).

A sensor, which is provided on the lateral side or rear side of the vehicle 1 changing a lane, may detect an object driving in a lane on which the vehicle 1 is to drive, and output a detection signal, which includes information related the on/off of the sensor, and the steering torque for braking related to the result of the detection (72).

Based on the predetermined priority, the result of detection of the sensor provided at the lateral and rear side may be determined as the second priority. Based on the result of detection, the controller 300 may output an integrated control signal configured to perform a braking at 72 or less on the graph. That is, based on the second priority, the controller 300 may control the braking device driver 400 to operate the wheels 21 and 22 clockwise.

As a result of the integrated control related to the second priority, the vehicle 1 may change a driving direction clockwise (73). That is, in a case such as 73, the driver may operate the steering wheel 124 clockwise. The vehicle 1 may easily change a route of the vehicle 1 by generating the steering torque that changes the vehicle wheels 21 and 22 clockwise.

While the vehicle 1 changes the driving direction, an adjacent vehicle driving on other lane may change its driving lane to a lane on which the vehicle 1 is to drive (74).

In this case, the sensor provided in front of the vehicle 1 may detect an adjacent vehicle that changes the lane, and may transmit a detection signal related to a detection result, to the controller 300. That is, the controller 300 may receive a detection signal of other sensor while operating the braking device driver 400 by receiving an on-signal of the second priority.

As described above, based on the priority, the controller 300 may identify a detection signal configured to output an integrated control signal, among the plurality of detection signals from the plurality of sensors 200.

For example, when the detection signal received from the front sensor is set to a high priority, the controller 300 may first compare signs of the steering torque as described above with reference to FIG. 5.

On the graph, the sign of the steering torque related to the second priority, at a point of time when the detection signal detected by the front sensor is received, is "+". That is, it may be the case where the vehicle 1 has not yet completely changed its driving direction based on the previous lane.

A sign of the steering torque for the control to be output based on the first priority may be opposite in comparison with the control based on the second priority, and the controller 300 may immediately change the integrated control related to the second priority, and output an integrated control signal related to the first priority (75).

Accordingly, the vehicle 1 may efficiently perform the ADAS and improve the stability.

Referring to FIGS. 8A-8H, a sensor provided in front of the vehicle 1 may detect an adjacent vehicle that changes a lane while the vehicle 1 changes a driving direction into the clockwise direction based on the second priority (85).

In the same manner as FIGS. 7A-7G, a detection signal output by the front sensor may be set to the higher priority than the second priority. However, a sign of a steering torque in the current vehicle 1 controlled based on the second priority may be the same as a sign of a steering torque, which is generated based on the first priority.

When the signs of the steering torque are the same as described above, the controller 300 may not immediately output the control signal related to the result of detection having the high priority, which is different from FIGS. 7A-7G.

That is, when the magnitude of the steering torque related to the second priority is greater than the magnitude of the steering torque related to the first priority at a point of time when a detection signal having the high priority is received (85), the controller 300 may continuously control the braking device driver 400 by using the integrated control signal related to the second priority.

As illustrated on the graph, the controller 300 may output an integrated control signal related to the first priority at a point of time when the magnitude of the steering torque related to the second priority is less than the magnitude of the steering torque related to the first priority (86).

Accordingly, the vehicle 1 may efficiently perform the ADAS and improve the steering of the driver.

However, the present disclosure is not limited that the vehicle 1 outputs an integrated control signal having the high priority in a state of waiting for a point of time when the magnitude of the steering torque becomes large. In another embodiment, the controller 300 may store the control method as shown in FIGS. 8A-8H, and as soon as a similar situation occurs, the controller 300 may perform a system switching so as to quickly output a control signal with a high priority.

As mentioned above, the vehicle and the control method thereof according to the exemplary embodiments, it may be possible to mediate and integrate the plurality of sensors outputting the plurality of detection signals so as to output a single control signal and thus it may be possible to avoid the collision and confusion among braking signals.

In addition, the vehicle and the control method thereof according to an embodiment, it may be possible to reduce an overlapped signal by performing series braking and steering based on the priority in an area in which the plurality of signals is overlapped, and thus it may be possible to effectively perform the ADAS.

The vehicle may improve the steering and stability of the driver by smoothly connecting the control signal to the system transition by using the above mentioned control method.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which can be decoded by a computer are stored. For example, there may be a Read Only Memory (ROM), a Random Access Memory (RAM), a magnetic tape, a magnetic disk, a flash memory, and an optical data storage device.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A vehicle comprising:
    a plurality of sensors configured to detect an object and to output a plurality of detection signals including a steering torque related to a result of detection;
    a braking device driver configured to drive a braking device of the vehicle; and
    a controller configured to select a single detection signal from among the plurality of detection signals based on a predetermined priority, and configured to output an integrated control signal controlling the braking device driver based on the steering torque of the selected detection signal,
    wherein while outputting the integrated control signal related to a first detection signal among the plurality of detection signals, the controller selects the single detection signal by identifying whether a second detection signal having a priority, which is higher than that of the first detection signal, is turned on, and when a sign of a first steering torque of the first detection signal is not identical to a sign of a second steering torque of the second detection signal, the controller outputs the integrated control signal based on the second steering torque.

2. The vehicle of claim 1, wherein when the sign of the first steering torque is identical to the sign of the second steering torque, the controller compares a magnitude of the first steering torque with a magnitude of the second steering torque.

3. The vehicle of claim 2, wherein when the magnitude of the second steering torque is greater than the magnitude of the first steering torque, the controller outputs the integrated control signal based on the second steering torque.

4. The vehicle of claim 2, wherein when the magnitude of the second steering torque is not greater than the magnitude of the first steering torque, the controller outputs the integrated control signal based on the first steering torque.

5. A control method of a vehicle comprising:

receiving, by a controller, a plurality of detection signals having a steering torque related to a detection result of a plurality of sensors detecting an object;

selecting, by the controller, a single detection signal from among the plurality of detection signals, based on a predetermined priority, wherein the selecting the single detection signal comprises selecting, while outputting an integrated control signal related to a first detection signal among the plurality of detection signals, the single detection signal by identifying whether a second detection signal having a priority, which is higher than that of the first detection signal, is turned on;

outputting, by the controller, the integrated control signal controlling a braking device driver, based on the steering torque of the selected detection signal; and driving, by the controller, the braking device driver of the vehicle based on the integrated control signal, wherein the outputting the integrated control signal comprises outputting the integrated control signal based on a second steering torque of the second detection signal when a sign of a first steering torque of the first detection signal is not identical to a sign of the second steering torque.

6. The control method of claim 5, further comprising:

comparing a magnitude of the first steering torque with a magnitude of the second steering torque when the sign of the first steering torque is identical to the sign of the second steering torque.

7. The control method of claim 6, wherein the outputting the integrated control signal comprises:

outputting the integrated control signal based on the second steering torque when the magnitude of the second steering torque is greater than the magnitude of the first steering torque; and outputting the integrated control signal based on the first steering torque when the magnitude of the second steering torque is not greater than the magnitude of the first steering torque.

8. The control method of claim 5, wherein the outputting the integrated control signal comprises:

storing a point of time of outputting the integrated control signal; and when it is identified that the second detection signal is turned on, outputting the integrated control signal by converting the point of time.

* * * * *